United States Patent [19]

Gines et al.

[11] Patent Number: 5,209,325
[45] Date of Patent: May 11, 1993

[54] BRAKING APPARATUS AND METHOD FOR STORAGE AND RETRIEVAL VEHICLES

[75] Inventors: Paul K. Gines, Bountiful; Richard M. Dicks, Salt Lake City, both of Utah

[73] Assignee: Eaton-Kenway, Inc., Salt Lake City, Utah

[21] Appl. No.: 684,410

[22] Filed: Apr. 12, 1991

[51] Int. Cl.$^5$ .............................................. B66B 5/26
[52] U.S. Cl. ...................................... 188/67; 187/89; 187/90
[58] Field of Search ....................... 188/67, 43, 44, 62, 188/63, 156, 157, 161, 162, 163, 164, 165, 159; 187/89, 90, 91, 83, 76

[56] References Cited

U.S. PATENT DOCUMENTS

| | | | |
|---|---|---|---|
| 615,080 | 11/1898 | Lurye | 187/90 |
| 981,671 | 1/1911 | Murphy | 187/90 |
| 2,150,373 | 3/1939 | Hymans | 187/90 |
| 2,945,561 | 7/1960 | Moyer | 187/89 |
| 3,601,227 | 8/1971 | Burch | 187/89 |
| 4,089,391 | 5/1978 | Schill | 187/89 |

FOREIGN PATENT DOCUMENTS 8603184  5/1986  World Int. Prop. O. ............. 187/90

*Primary Examiner*—Matthew C. Graham

[57] ABSTRACT

Novel braking system, assemblies, and methods for storage and retrieval vehicles finding particular application on dual mast storage and retrieval vehicles where it is important to brake both sides of a carriage disposed between the two masts simultaneously. The braking system comprises an actuator assembly which further comprises a tach/generator which derives rotational energy from the rate-of-travel of the carriage relative to an associated guide rail. An electrical circuit, which runs off power derived from the tach/generator, detects overspeed rate-of-travel of the carriage and sends an electrical signal, also deriving power from the tach/generator, to electrically actuate at least one brake. Each brake is firmly affixed to the carriage and comprises a cam which is electrically driven by a solenoid, to engage an associated guide rail when actuated. When the cam is actuated and the carriage falls toward the braking cam, interposed shock absorbers decelerate the carriage. The brake comprises a lower housing assembly which provides support for the cam and shock absorbers and an upper housing assembly against which the shock absorbers act to decelerate the carriage. An intermediate assembly suspends the lower housing assembly from the upper housing assembly, providing a rhomboid attachment whereby the shock absorbers are maintained in a substantially perpendicular disposition relative to the upper housing assembly independent of the offset of the lower housing assembly from the upper housing assembly.

43 Claims, 6 Drawing Sheets

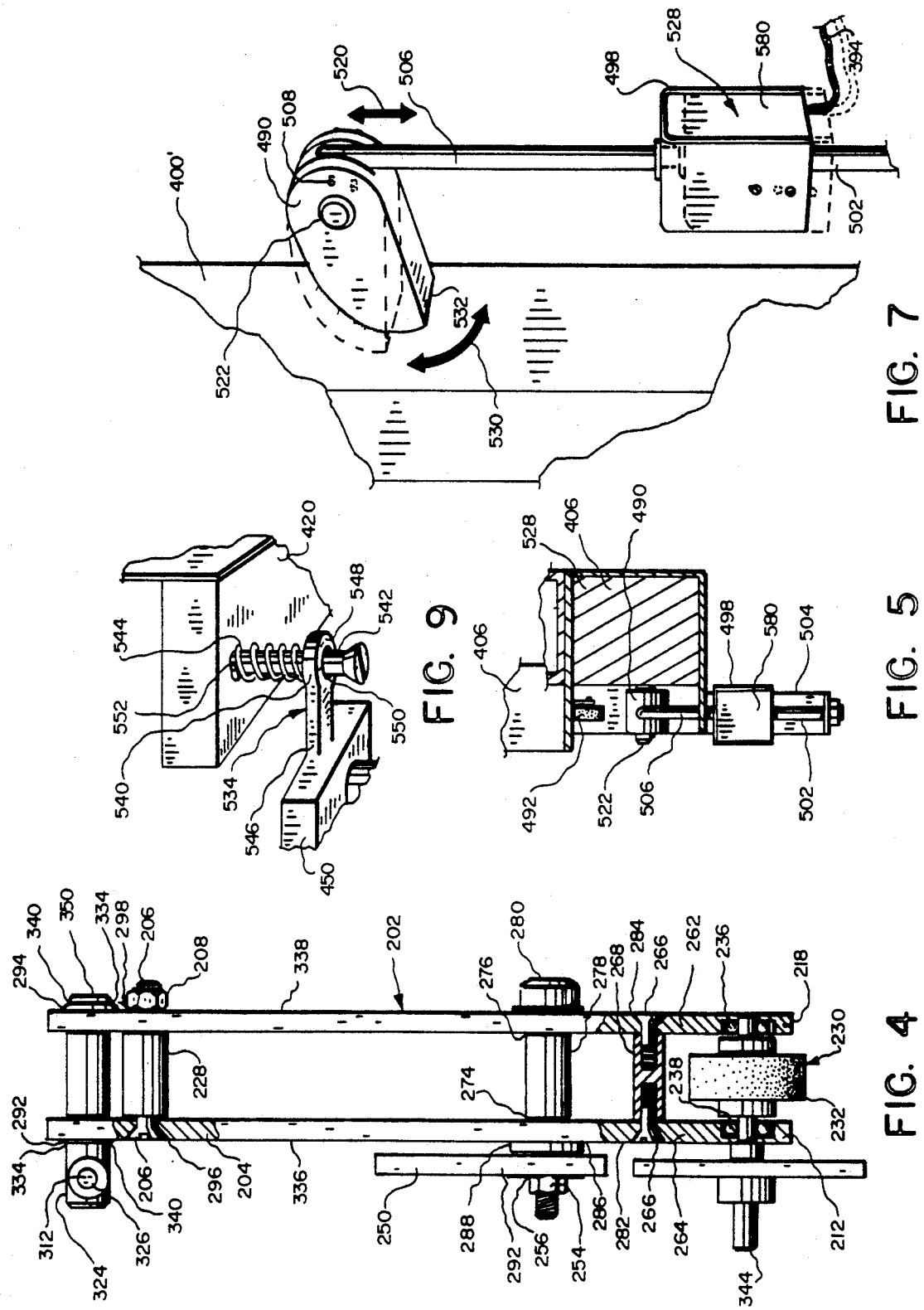

BRAKING APPARATUS AND METHOD FOR STORAGE AND RETRIEVAL VEHICLES

FIELD OF INVENTION

This invention relates to emergency overspeed braking devices and methods for braking vertically traveling carriages on storage and retrieval vehicles and particularly to self-contained electrically generating emergency overspeed braking devices and methods for storage and retrieval vehicles.

DESCRIPTION OF RELATED ART

Storage and retrieval (S/R) vehicles comprise vertically travelling carriages by which addressable stacked arrays of storage are accessed. As a standard safety precaution, each storage and retrieval vehicle comprises at least one braking device which detects an overspeed condition of descent of the carriage and actuates a braking mechanical part which acts against a portion of a supporting mast to bring the carriage to a halt.

The traditional method of overspeed sensing and braking operation has involved mechanically activated brakes such as spring loaded fly weights which employ centrifugal force of high speed rotation to actuate the braking device. While such braking devices have been effective on single mast S/R vehicles, such is not the case on a dual mast S/R vehicle. Using mechanically activated brakes for dual mast operation requires a very difficult-to-implement design where a brake associated with each side of the carriage and therefor each mast must operate at precisely the same time to bring the carriage to a safe, horizontally disposed halt. Such must be accomplished either through meticulous mechanical design comprising exacting predetermined response characteristics of a wide range of emergency conditions of a falling carriage or through a linkage which mechanically triggers simultaneous braking from a single sensor. Accomplishment of such a mechanical linkage for a dual braking system is awkward as carriages may be as long as twenty-five feet, especially when considering that such linkages usually have built in free play.

Another consideration is that traditional brake actuation mechanisms are driven by a roller chain suspended along the side of the mast wherealong the carriage travels. The chain slaps back and forth as the machine accelerates and is distracting and aesthetically unappealing. Also current art actuators and brake assemblies are adjusted to proper operating location after the carriage is leveled on the mast, requiring a serial process of first installing and leveling the carriage before final installation and adjustment of the braking device. Further, on dual mast systems, as masts deflect under weight of changing loads, mechanical brakes wear against the mast, requiring shimming to counteract some of the deflection.

BRIEF SUMMARY AND OBJECTS OF THE INVENTION

In brief summary, this novel invention alleviates all of the known problems generally attributed to braking devices for S/R vehicles and particularly to braking devices for dual mast S/R vehicles. This invention comprises an actuator assembly and at least one braking assembly. For a dual mast application, at least two braking assemblies are employed. The actuator assembly comprises a wheel/generator assembly which derives rotational energy from at least one wheel which rides with the carriage and is spring loaded against a portion of the mast, such as a guide rail used for vertically steering the carriage. The derived energy is transferred to a tach/generator or motor generator which produces an electrical signal which is proportional to the angular velocity of the wheel and therefor the vertical rate of carriage ascent or descent.

Output of the tach/generator is sent to an electrical circuit wherein a real time analysis is performed continuously upon the electrical output signal. The electrical circuit comprises a predetermined threshold which, if exceeded, causes each braking device to actuate. All power for the electrical circuit and each braking device operation is derived from the tach/generator, thus the entire actuator assembly/braking device operation is self-contained.

Each braking device comprises a solenoid operated cam. The solenoid is affixed to the cam in a novel manner which uses the weight of the solenoid as a counter balance on the cam, thereby requiring less power to actuate the cam and therefor the brake. When the generator output signal exceeds the predetermined threshold, a signal is sent to the solenoid, the housing of the solenoid, which is affixed to the cam, moves against a stationary piston to force the cam into the guide rails and brake the carriage.

As the same tach/generator output as processed by the electrical circuit is sent to each braking device at the same time, the only differential in time between braking operation of two braking devices is the variability of actuation between the solenoids of the two braking devices, which is in the order of milliseconds. Thus, when an over threshold signal is detected, both sides of the carriage are braked at substantially the same time.

Each braking assembly comprises a fixed bracket mount to the carriage, a pivot system that establishes a four bar linkage which is spring loaded to maintain vertical position and alignment of the brake block, two hydraulic shock absorbers, a brake block which mounts cam and solenoid assembly. As the carriage is moved up and down the mast, and/or the S/R vehicle is moved up and down an aisle, relative movement of the masts result due to the acceleration forces and load variations. The brake block which is suspended from the pivot system comprises a camrol guidance bearing. The pivot system is loaded so that the camrol guidance bearing on the guide rail and serves as a means for the brake block to follow the guide rail.

Due to the limited amount of energy available from the generator, the cam must be rotated in an efficient manner. Therefore, the solenoid coil has been suspended from the side opposite the guide rail contacting portion of the cam to aid in counterbalancing the weight of the rail contacting portion of the cam. When an overspeed condition occurs and electrical energy from the generator is applied to the cam solenoid, the solenoid retracts against a rigidly affixed solenoid plunger. Since the solenoid plunger is held relatively immobile, the solenoid housing which is affixed to the cam moves to engage the cam teeth with the guide rail. The force of the rapidly moving carriage continues to force the cam teeth into the rail and to its full travel and locked position. The solenoid plunger is spring loaded to prevent damage to the solenoid housing and other components when the cam is forced to the full travel limit.

As the cam is driven into the guide rail, the brake block is pivoted away from the rail by the cam, which unloads the camrol guidance bearing until the clearance in the brake block for the guide rail is taken up and the cam is extended to its full depth into the rail. In this position, the teeth on the cam exert a shear stress on the rail material and the cam serves to lock the brake block to the mast guide rail. The fixed bracket which is mounted to the rapidly moving carriage then drives downward onto the hydraulic shock absorbers which serve to decelerate the carriage at a controlled rate.

Accordingly, it is a primary object to provide a self-contained, electricity generating actuating assembly which senses the rate of travel of a carriage disposed on a S/R vehicle and acts in combination with at least one braking assembly to bring the carriage to a halt when it is travelling overspeed.

It is another primary object to provide an electricity generating and sensing actuating assembly which electrically activates at least two braking assemblies disposed on a carriage on a dual mast S/R vehicle to thereby halt the carriage when it is travelling downward at an overspeed falling rate.

It is yet another primary object to provide an electrical generating and sensing actuating assembly which simultaneously sends an electrical signal, indicating an overspeed carriage, to more than one braking assembly, each of which is attached at different points on the carriage, thereby substantially activating all of the signal receiving braking devices and thereby braking the carriage at all of the points at essentially the same time.

It is an object to provide an electricity generating actuating assembly which derives an electrical signal based upon the rate of travel of the carriage from at least one wheel disposed against a rail disposed on a mast whereupon the carriage travels vertically.

It is another object to provide at least two wheels mechanically linked such that slippage of one of the wheels as it travels along the rail is overcome by the frictional travel of the at least one other wheel to maintain a dependable rate of travel signal with adverse wheel to rail frictional conditions.

It is another object to provide a direct linkage to at least one of the at least one wheels whereby the rate of travel of the at least one wheels is translated to an electrical generator thereby producing an electrical signal which is a function of the rate of travel of the carriage.

It is another object to provide an electrical circuit which receives the electrical signal provided by the electrical generator and provides a brake actuating signal to at least one braking assembly when the voltage from the electrical generator exceeds a predetermined value.

It is an important object to provide a brake actuating assembly which comprises an electrically operated cam which is moved to engage a stationary part of the mast when the brake actuating signal is received from the electrical circuit and to thereby stop the carriage when it is falling at an overspeed rate.

It is another important object to provide a solenoid which activates the electrically operated cam.

It is still another important object that the cam be hingeably connected to and thereby counterbalanced by the housing of the solenoid which moves against an associated solenoid plunger which is held stationary relative to the position of the cam, thereby reducing the electrically generated force required to move the cam.

It is another object to provide a braking mechanism which comprises a superiorly placed part attached to the carriage, an inferiorly placed part which comprises the electrically operated cam, and an intermediate part, interposed between the superiorly placed and inferiorly placed parts, which comprises a connecting part which maintains a connection and parallel alignment between the superiorly and inferiorly placed parts and at least one decelerating part which halts the superiorly placed part and therefore the carriage when the cam is activated.

It is another object that the connection maintaining part and the decelerating part be two different parts.

It is another object that the decelerating part be at least one shock absorber.

These and other objects and features of the present invention will be apparent from the detailed description taken with reference to accompanying drawings.

BRIEF DESCRIPTION OF THE DRAWINGS

FIG. 4 is a side elevation view along lines 4—4 of FIG. 1, with sections cut away for clarity of presentation.

FIG. 5 is an elevation view along lines 5—5 of FIG. 2.

FIG. 7 is a perspective of parts seen in FIG. 5 wherein a cam and solenoid attachment to the cam is seen and other parts have been removed for clarity of presentation.

FIG. 9 is a segmented perspective, taken along lines 9—9 of FIG. 2, of a spring-lever cam-biasing assembly.

DETAILED DESCRIPTION OF THE ILLUSTRATED EMBODIMENTS

In this description, the term proximal is used to indicate the segment of the device normally closest to the viewer or to the point of reference when it is being used. The term distal refers to the other end. Reference is now made to the embodiment illustrated in FIGS. 1-10 wherein like numerals are used to designate like parts throughout. All structural parts, unless otherwise specified may be made from construction grade steel.

Figure 1:
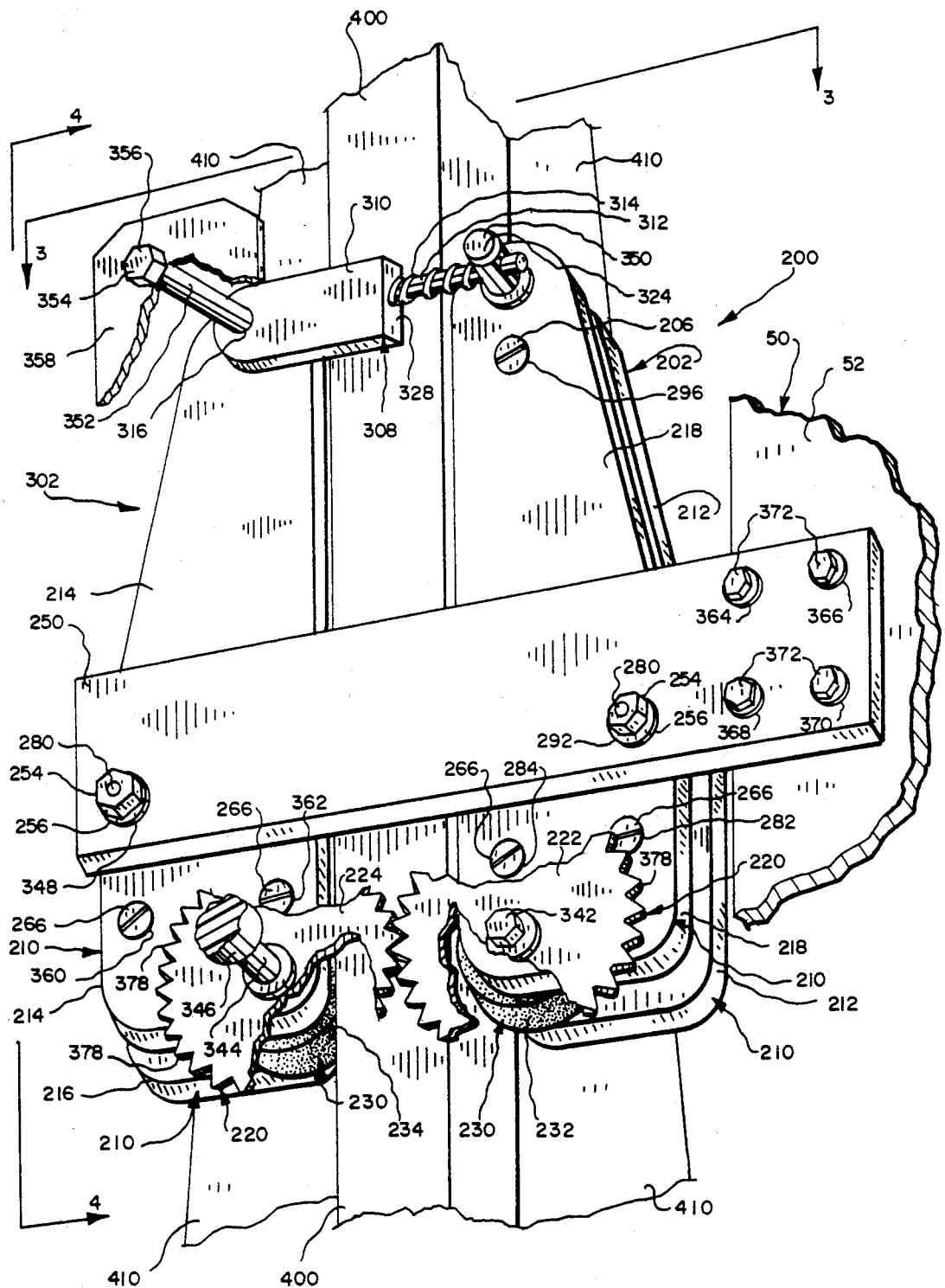
FIG. 1 is a perspective of a brake actuator affixed to part of a carriage which travels along a guide rail with some parts cut away for a better view of otherwise hidden parts.
Figure 2:
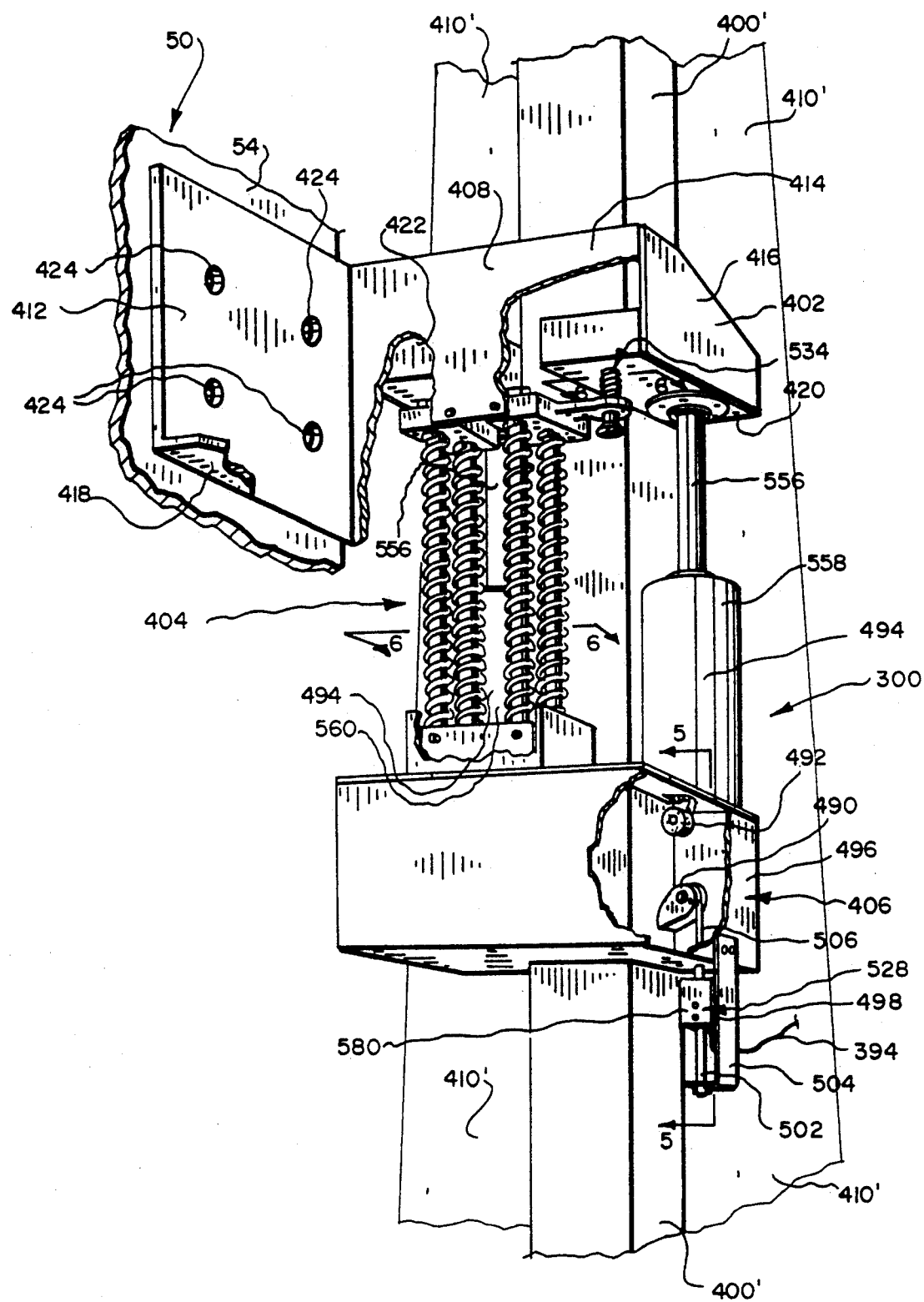
FIG. 2 is a perspective of a braking device, also mounted on the carriage and next to the guide rail, with parts cut away to show other hidden parts.
Figure 10:
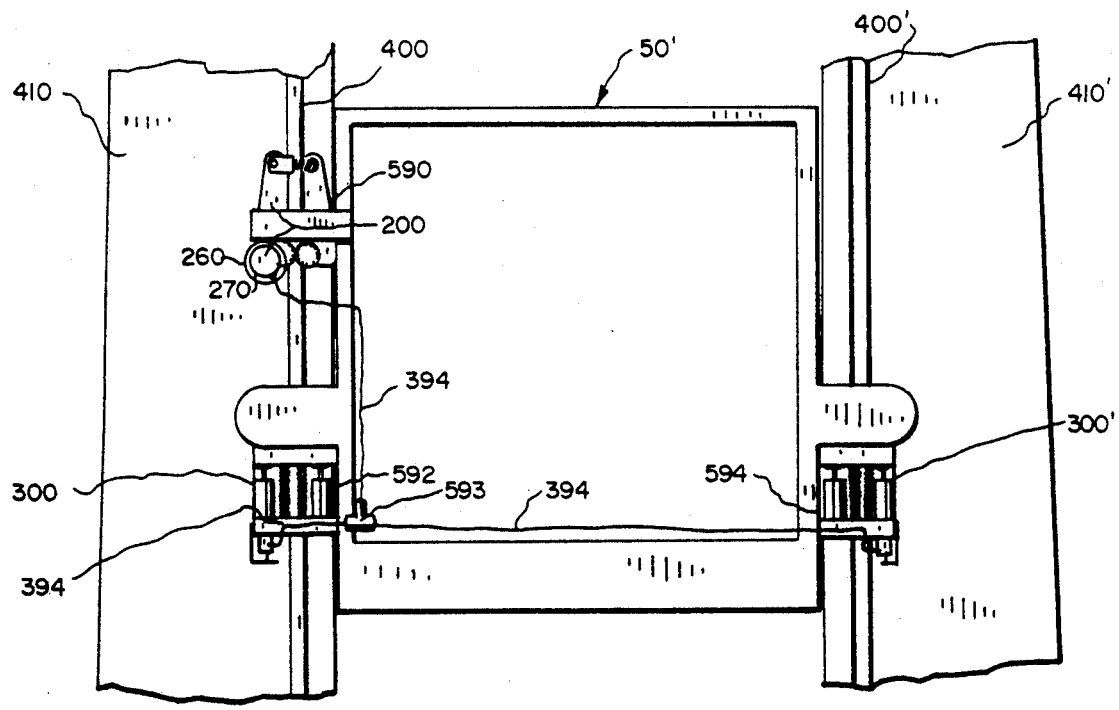
FIG. 10 is a schematic layout of a carriage between two masts of a dual mast storage and retrieval vehicle comprising the braking actuator and a brake associated with each mast one on each side of the carriage.

As seen in FIGS. 1 and 2, the invention comprises an actuator 200 and a brake 300 referenced from FIG. 10. Actuator 200 is firmly affixed to a structural member 52 of a carriage 50 to measure the rate of travel thereof relative to a mast 410 and an associated guide rail 400 along which carriage 50 travels. Brake 300 is also firmly affixed to another structural member 54 of carriage 50 at a position where brake 300 is actuated against a guide rail, such as guide rail 400 to brake carriage 50 when braking is necessary. As described in detail later, the communicating output of actuator 200 to at least one break 300 is an electrical signal which activates brake 300 when the rate of fall of carriage 50 exceeds a predetermined velocity. Because of the electrical linkage, actuator 200 may be separated from each brake 300 by a distance greater than would otherwise be practical using mechanical linkages between an actuator and a mechanically actuated brake.

The rate of travel sensor of actuator 200 is at least one friction wheel 230 which measures rate of travel by the rotational rate of friction wheel 230 traveling along a stationary guide rail 400. As seen in FIG. 1, this currently preferred embodiment comprises a pair of friction wheels 232 and 234, generally identified as friction wheel 230, juxtaposed on opposite sides of guide rail 400 to provide redundancy of measurement. Such redundancy is particularly beneficial when there is a tendency for wheel slippage due to contaminants on guide rail 400 or when one friction wheel 230 fails. Each friction wheel 230 comprises a castor wheel which is known and available in the art. Each friction wheel 230 may comprise neoprene tread for better traction and may range from two to four inches in diameter and from one and one-half to one and seven-eighths of an inch wide. Wheel diameters are varied as the predetermined velocity at which brake 300 is actuated is varied.

Each friction wheel 230 is axially mounted between a pair of pressure transmitting links 218 and 212 and 214 and 216, each link generally identified as link 210, for each friction wheel 232 and 234, respectively. Link 218 is substantially the same as link 212. Link 214 is also substantially the same as link 216. Link 212 is of the same form as link 214, but of opposite hand. Unique characteristics which set each link 210 part from other links 210 are described in detail hereafter.

Before link 212 is firmly affixed to link 218, a plurality of pivoting or rotating parts are interposed therebetween. As seen in FIG. 4, link 212 comprises a bearing 238 for friction wheel 232. Link 218 comprises a bearing 236 for the other side of friction wheel 232 juxtaposed the site of bearing 236.

Figure 3:
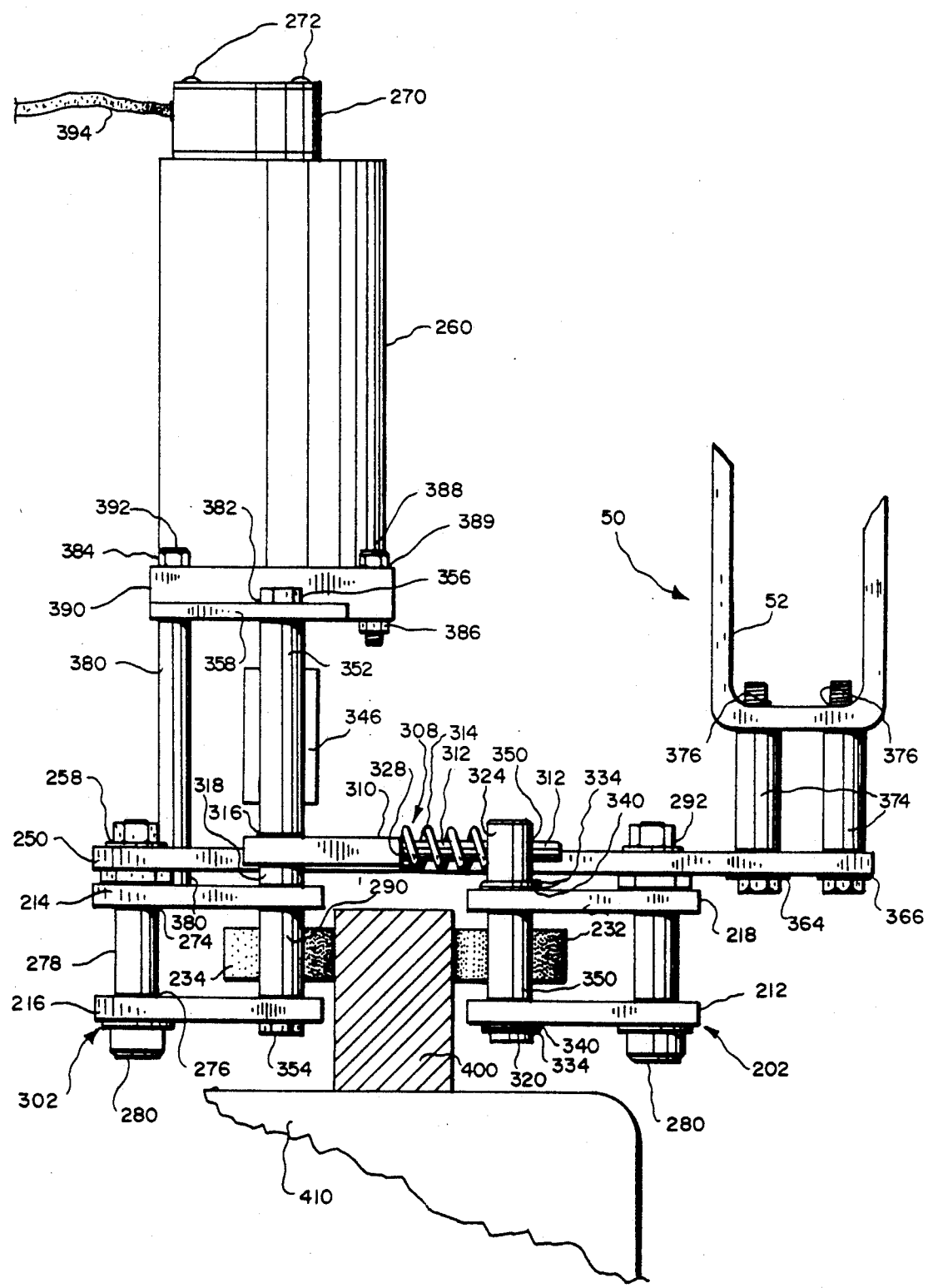
FIG. 3 is a top elevation view along lines 3—3 of FIG. 1.

Each link 212 and 218 comprises a hole at sites 274 and 276, respectively, where a spacer 278 is interposed. Spacer 278 is held in place by bolt 280 inserted therethrough. On the lateral side 286 of link 212, a washer 288 is interposed between link 212 and a mounting bracket 250, which comprises a hole at site 292 to retain a shoulder screw 280. Thereby, each link 212 and 218 is pivotally joined to mounting plate 250 at site 292 by shoulder screw 280 which is firmly affixed thereat by a lock-washer 256 and a nut 254 as seen in FIG. 1. The pivot point at site 292 is positioned such that if the carriage were moving downward and the friction wheel(s) 232 were to begin to slip, this force would create a positive moment about site 292 which would be reacted by the wheel on the rail, thus, increasing the normal force and decreasing its tendency to slip. Seen at the top of FIG. 4 between sites 292 and 294, a rod 350 is inserted, as best seen in FIGS. 3 and 4. Rod 350 is held in place by a spring clamp 334 disposed on rod 350 on the lateral side 336 and 338 of each link 212 and 218, respectively. A washer 340 is interposed between each spring clamp 334 and each lateral side 336 and 338 to provide a pivotable connection.

As seen in FIG. 4, the link 212 is joined and spaced apart from link 218 by a threaded standoff 268. As seen in cut away section 264, link 212 comprises a hole and screw head inset at site 282 for a screw 266. Similarly, in cut away section 262, link 218 comprises a hole and screw head inset at site 284 for another screw 266. The threaded standoff 268 is interposed between link 212 and 218, juxtaposed site 282, and a screw 266 is tightened therein to affix standoff 268 to link 212 at a first site. Threaded standoff 268 is also juxtaposed site 284 and the other screw 266 is tightened therein to affix standoff 268 to link 218 at a second site. Stand-offs, screws, connecting bolts, and nuts as used in this embodiment are well known and available in the art. A second site 342 is seen in FIG. 1 where another standoff 268 is interposed between each link 212 and 218 and affixed in place to each link 212 and 218 by an additional screw 266 at a site 342 in link 212 and another juxtaposed site in link 218 (not shown) provides a second attachment between links 212 and 218.

Link 212 also comprises a hole and head inset for a bolt 206 at a site 296. Link 218 comprises a hole for the shaft of bolt 206 at site 298. A standoff 228 is interposed between juxtaposed sites 296 and 298. Bolt 206, seen in cut away 204, is inserted through the hole at site 296, standoff 228, and the hole at site 298 and a nut 208 is affixed thereto to firmly attach link 212 to link 218 and completing assembly 202 which comprises the joining of link 212 to link 218.

As best seen in FIG. 1, friction wheel 234 is mounted between links 214 and 216 in the same manner as friction wheel 232 is mounted between links 212 and 218, but of opposite hand. However, the shaft 344 about which friction wheel rotates is extended proximally to connect with a coupling 346 for purposes described in detail hereafter. In like manner to the connection of links 212 and 218 to mounting plate 250 at site 292, links 214 and 216 are pivotally joined to mounting plate 250 at site 348. Links 214 and 216 also each comprise a hole juxtaposed site 316. As best seen in FIG. 3, link 214 is firmly affixed to link 216 by a bolt 354 inserted through each hole juxtaposed site 316 in links 214 and 216 and through an interposed standoff 290, a standoff 318, a spring block 310, and into a threaded standoff 352. Another bolt 356 is inserted at location 382 through a motor mounting plate 358, and tightened into a threaded hole in standoff 352. The purpose and function of parts interposed between line 214 and bolt 356 are described in detail hereafter.

Referring again to FIG. 1, links 214 and 216 are joined at sites 360 and 362 in the same manner as links 212 and 218 are joined at sites 282 and 342. Thus link 214 is joined to link 216 to form assembly 302.

Members which join assembly 202 to assembly 302 comprise mounting plate 250 and a compression spring assembly 308. As best seen in FIGS. 1 and 3, compression spring assembly 308 comprises a spring block 310, a guide rod 312, and a compression spring 314. Spring block 310 comprises a spring inhibiting edge 328 on one end and a hole at the other end at a site 316 wherethrough bolt 354 is inserted for hingeable attachment. At edge 328 spring block 310 is permanently attached to guide rod 312. Spring block 310 is laterally offset from link 214 by the width of standoff 318 as seen in FIG. 3. Guide rod 312 extends from the area of permanent attachment with spring block 310 at spring inhibiting edge 328 beyond the axis of a rod 350, disposed in links 212 and 218 along as earlier described. Rod 350 is of sufficient girth to comprise a hole 326 in end 324 seen best in FIG. 4, wherethrough guide rod 312 easily passes, but small enough to retain compression spring 314 from passage therethrough. When compression spring assembly is disposed in a spring compressed state with friction wheels 232 and 234 disposed against guide rail 400 as seen in FIG. 3, the force of compression spring 314 acts across pivot sites 292 and 348 to maintain compressive engagement of friction wheels 232 and 234 against mast rod 400.

As best seen in FIGS. 1 and 3, mounting plate 250 is affixed to a structural member 52 of carriage 50. Mounting plate 250 is secured to structural member 52 at a pattern of holes at sites 364, 366, 368, and 370. A like pattern of threaded holes, generally designated threaded hole 376, is provided in structural member 52 at juxtaposed sites 364, 366, 368, and 370. A bolt 372 is inserted through each the hole at each site 364, 366, 368, and 370 and through an offsetting standoff 374 and threadably retained in each juxtaposed threaded hole 376 at sites juxtaposed each site 364, 366, 368, and 370 in structural member 52. Each bolt is tightened thereat to firmly affix actuator 200 to carriage 50.

As best seen in FIG. 1, friction wheel 232 is axially connected to a gear 222, each gear being generally designated as gear 220. Similarly, friction wheel 234 is axially connected to a gear 224. Each gear 220 is disposed against the other gear 220 such that turning of either gear 220 forces the other gear 220 to turn at a like rate. While teeth 378 of each gear 220 is disposed to mesh with the teeth 378 of the other gear 220, sufficient play is provided between the meshing teeth 378 to permit each friction wheel 230 to remain compressed against guide rail 400 independent of variations seen in the width of guide rail 400 as carriage 50 moves along mast 410. Each gear 220 may comprise a 63 tooth, 16 diametrical pitch, with a 14.5 degree pressure angle structure. Such gears are known and available in the art.

The moving carriage 50 possesses kinetic energy. Carriage movement rotates the friction wheels 232 and 234. A portion of this kinetic energy is converted to electrical energy by a tach/generator or motor generator, commonly referenced motor 260 and seen in FIG. 3. Motor 260 is axially connected to friction wheel 234 by coupling 346, seen in part in FIGS. 1 and 3. Motor 260 is mounted on a motor mounting plate 358. In the currently preferred embodiment, motor mounting plate 358 is affixed to assembly 302 at three points. The first point 382 is disposed laterally away from spring block 310 as best seen in FIG. 3. Lateral separation is provided by standoff 352. Motor 260 is affixed to motor mounting plate 358 by a motor bracket 390 comprising four mounting holes, as is well known in the art. Motor 260 may be a DC servo motor such as a DC Servo Motor 1410-LT, manufactured and distributed by Aero Tech, Pittsburgh, Pa.

The second point 384 is juxtaposed one of the four mounting holes of motor bracket 390, thereby affixing motor 260 to motor mounting plate 358 as motor mounting plate 358 is affixed to assembly 302. The second point 384 comprises a position of attachment through a standoff 380, disposed inferiorly to first point 382 such that the axle of motor 260 is juxtaposed the axis of coupling 346. A threaded hole in link 214 is juxtaposed second point 384. A bolt 392 is inserted through the hole in motor bracket 390, through a juxtaposed hole in mounting plate 358, through standoff 380, and tightened into the threaded hole in link 214. The third point (not shown) is inferiorly disposed in line with second point 384 as seen in FIG. 3 and is also juxtaposed one of the mounting holes in motor bracket 390. Motor 260 is affixed at the third mounting point to motor mounting plate 358 which is affixed to assembly 302 as parts are affixed at second point 384. Motor mounting bracket 390 is affixed through a remaining mounting hole 389 by a bolt 388 and nut 386 and through another hole (not shown) in the same manner.

So affixed to mounting bracket 390, the rotor of motor 260 is directly connected to the axle of friction wheel 234 through coupling 346. Coupling 346 may be a coupling Al-0125-C.375 from Racom Corporation, 5957 Engineer Drive, Huntington Beach, Calif., 92649. Such a coupling provides efficient energy transferral in situations where the axles of friction wheel 234 and of motor 260 are not in perfect alignment.

When carriage 50 is traveling along guide rail 400, friction wheels 232 and 234 rotate in tandem. The rotational rate and energy is transferred to motor 260 through coupling 346 whereupon motor 260 responds as a motor generator emitting DC voltage which is proportional to the rate of travel of carriage 50. The polarity of the DC voltage is determined by the direction of travel of the carriage.

As seen in FIG. 3, an electrical circuit module 270 is affixed to motor 260 by attachment screws 272 or like connecting parts. An electrical cable 394 provides a communicating electrical signal to each associated brake 300.

Figure 8:
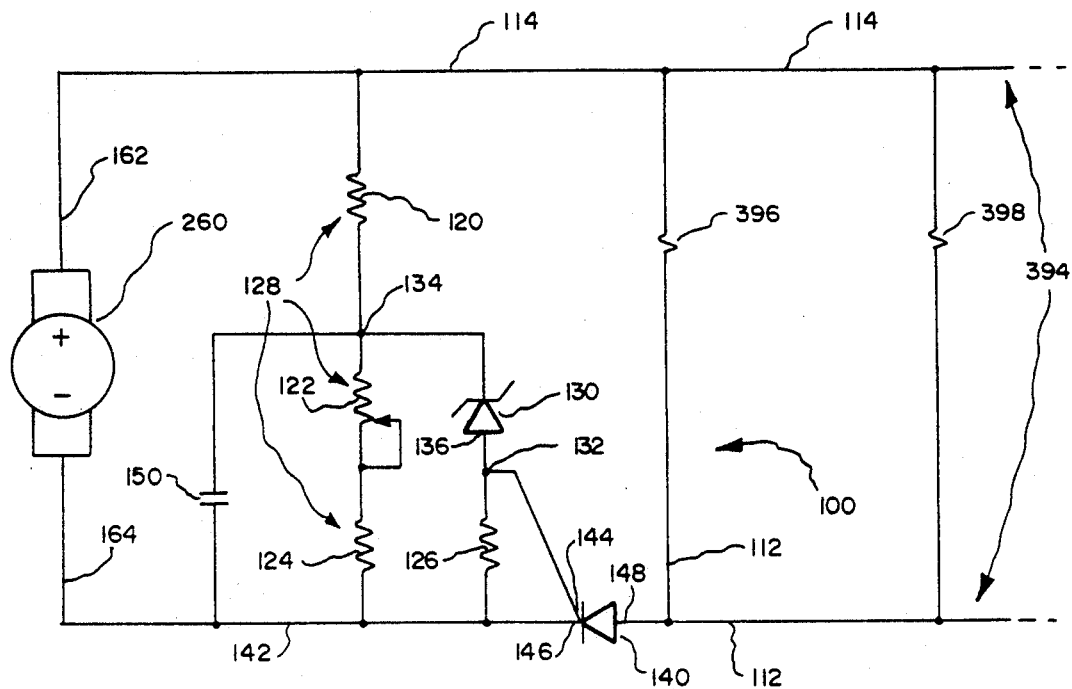
FIG. 8 is a diagram of an electrical circuit which is part of the electrical system of the brake actuator.

Reference is made to FIG. 8 wherein an overspeed detection circuit 100 contained within electrical circuit module 270 is seen. Overspeed detection circuit 100 used to detect and signal a falling carriage 50 comprises the following parts:

1. Tach/generator or motor generator (motor 260);
2. a voltage divider 128 comprising resistors 120 and 124 and a rheostat 122;
3. a Zener diode 130;
4. a bias resistor 126;
5. a solid state circuit switch 140;
6. a filter capacitor 150; and
7. at least one solenoid coil 396.

Output 162 from motor 260 is connected to one end of resistor 120 and to one side of the at least one solenoid coil 396. The other end of resistor 120, the cathode of Zener diode 130, one end of rheostat 122, and a lead of capacitor 150 are interconnected at node 134. The other end of rheostat 122 connects in series to one end of resistor 124 to complete voltage divider 128.

The anode 136 of Zener diode 130 is connected to gate 144 of solid state current switch 140 and one end of bias resistor 126 at node 132. the anode 148 of solid state circuit switch 140 is connected to the other side of solenoid coil 396. The cathode output 146 of solid state circuit switch 140 connects through line 142 to the negative terminal 164 of motor 260 and to each of the other sides of capacitor 150, resistor 124, and resistor 126 whereby a common return is provided to negative terminal 164.

As the carriage 50 moves down along guide rail 400, the positive output voltage generated by motor 260 is imposed upon the at least one solenoid 396 and the input to the voltage divider 128. The voltage seen at node 134 and therefore at the cathode of Zener diode 130 at any given point on time is the positive output voltage of motor 260 times the ratio of the sum of the resistance of rheostat 122 and resistor 124 and the resistance of voltage divider 128 comprising resistors 120 and 124 and rheostat 122 and filtered by filter capacitor 150.

The value of filter capacitor 150 is selected to provide a bypass for short-term fluctuations in the output voltage of motor 260, thereby eliminating unwanted braking due to minor, short-term variations in carriage 50 velocity. Selection and use of capacitors for such purpose are well known in the art.

Rheostat 122 provides an adjustment whereby the carriage 50 velocity at which solenoid coil 396 is activated is preset. As seen in FIG. 8, when Zener diode 130 conducts, current flows in gate-cathode 144 circuit of switch 140. When gate-cathode 144 current is present, forward biased solid state switch 140 is closed allowing current flow through the at least one solenoid coil 396. As a known predetermined voltage causes Zener diode 130 to conduct, at least a predetermined voltage is necessarily placed across the at least one solenoid coil 396 to provide adequate current to actuate the solenoid of solenoid coil 396.

Bias resistor 126, placed between node 132 and common 142, limits current through Zener diode 130 when it conducts, thereby ensuring a proper relationship of control voltage to solid state circuit switch 140 while safely limiting current through Zener diode 130.

Thus, as the output voltage of motor 260 increases due to acceleration of carriage 50, the voltage at node 134 increases until the breakdown voltage of Zener diode 130 is reached. When the breakdown voltage of Zener diode 130 is reached and exceeded, Zener diode 130 conducts thereby closing solid state circuit switch 140 and allowing current flow through the at least one solenoid coil 396. The current flow through the at least one solenoid 396 is determined by the output voltage of motor 260 and is adequate for solenoid actuation when solid state circuit switch 140 is closed by conducting Zener diode 130. When the at least one solenoid of solenoid coil 396 actuates, associated brake 300 is engaged as described hereafter.

As seen in FIG. 8, a second solenoid coil, designated 398, is also connected in parallel with solenoid coil 396. Second coil 398 is optional and used when more than one brake 300 is actuated by actuator 200. Connections between overspeed detection circuit 100 in electrical housing 270 and each solenoid coil 396, 398 disposed at a brake 300 are made via electrical cable 394 which comprises leads 114 and 112.

Brake 300 is seen in FIG. 2 affixed to carriage 50 at structural member 54. Similar to actuator 200, brake 300 is mounted in close relation with a guide rail, in this case designated guide rail 400' and associated with a mast 410'. Mast 410 and mast 410' may be the same mast. Also, guide rail 400' may be the same as guide rail 400. Brake 300 comprises an upper housing assembly 402, an intermediate suspension assembly 404, and a lower housing assembly 406.

Upper housing assembly 402 comprises a housing 408 which comprises a carriage connection plate 412, a cover panel 414, with sections thereof broken away to show otherwise hidden parts and a plurality of angular structural supporting members, two of which are seen as members 416 and 418 in FIG. 2. In addition, upper housing assembly 402 comprises a heavy, well-supported braking plate 420 and another heavy, well-supported braking plate 422, one of which is disposed on each side of guide rail 400'. Carriage connection plate 412 is releasibly, but firmly affixed to a side structural member 54 of carriage 50 by a plurality of bolts at sites 424 where connecting plate 412 and side structural member 54 comprise juxtaposed holes. Upper housing assembly 402 comprises sturdy construction which is able to support the weight of a braking carriage 50 imposed through braking plates 420 and 422 and through housing 408 to structural member 54 of carriage 50 at carriage connection plate 412.

Figure 6:
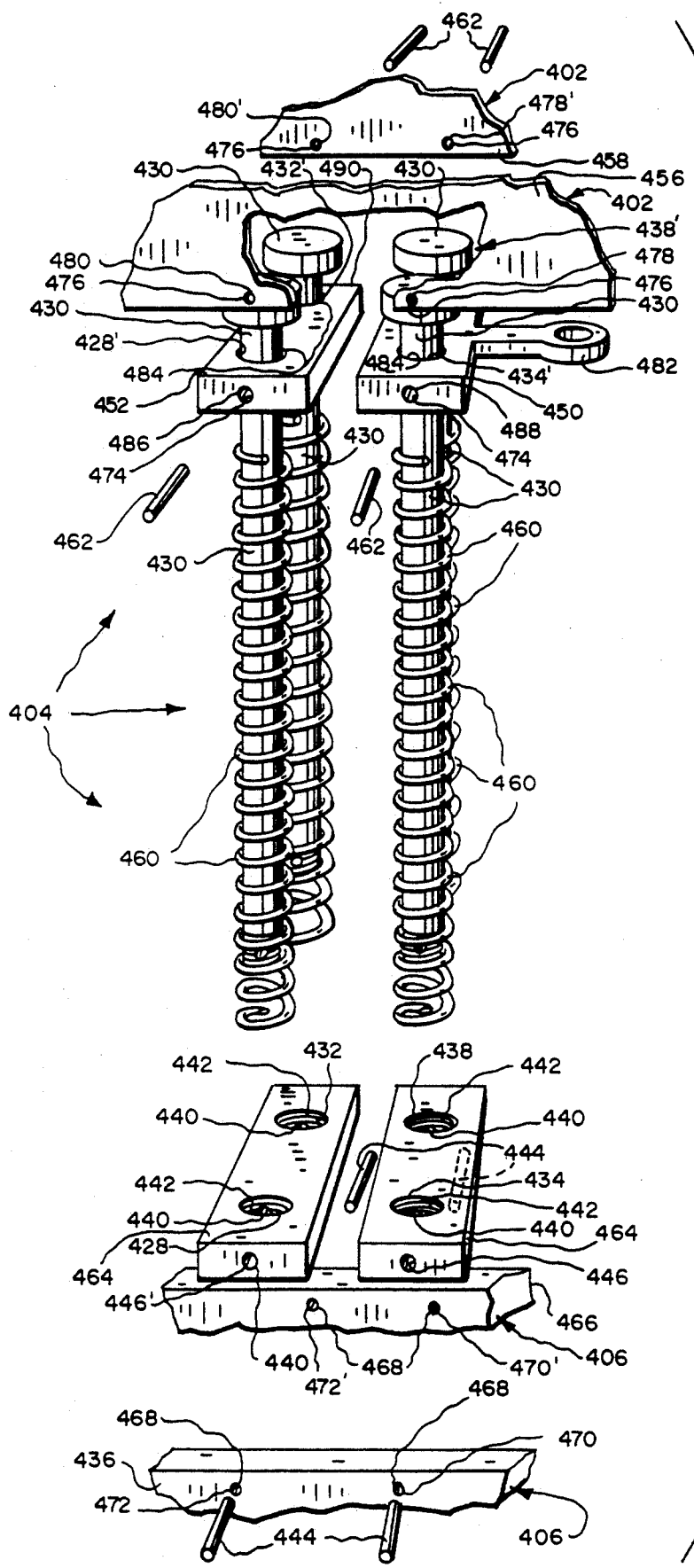
FIG. 6 is an exploded perspective taken along lines 6—6 of FIG. 2 wherein parts for an intermediate suspension assembly for a lower segment of the braking device are seen.

Lower housing assembly 406 is suspended from upper housing assembly 402 by intermediate suspension assembly 404. As is best seen in FIG. 6, intermediate suspension assembly 404 comprises four vertically disposed long bolts 430, four springs 460, four short pins 462, an upper slip plate 450 which comprises a camrol bias extender 482, another upper slip plate 452, two lower support plates 464, and two long pins 444. It is the purpose of intermediate suspension assembly to provide suspending support for lower housing assembly 406 during non-braking periods, but no support to either the lower housing support 406 or the upper housing support 402 during braking.

As seen in FIG. 6, upper slip plate 452 comprises a vertical hole 484 at site 428' and another vertical hole 484 at site 432'. The holes are symmetrically disposed along the longitudinal median of upper slip plate 452. Each vertical hole 484 is larger in diameter than the shaft of a long bolt 430 but narrower than a spring 460.

Lower support plate 464 comprises a hole 442 at site 428 and another hole 442 at site 432. Each hole 442 threadably accepts bolt 430. Sites 428 and 432 respectively juxtapose sites 428' and 432'. To assemble the left hand portion of intermediate suspension assembly 404, one bolt 430 is inserted through each hole 484 at sites 428' and 432' and a spring 460 is disposed over the shaft of each so inserted bolt 430. Each bolt is then inserted into a hole 442 at associated sites 428 and 432 and tightened therein to compressively capture spring 460 between upper slip plate 452 and associated lower support plate 464.

Similarly, upper slip plate 450 comprises a vertical hole 484 at site 434' and another vertical hole 484 at a distal site 438' (not shown). The holes are symmetrically disposed along the longitudinal median of upper slip plate 450. Sites 434 and 438 respectively juxtapose sites 434' and 438'. To assemble the right hand portion of intermediate suspension assembly 404, one bolt 430 is inserted through each hole 484 and a spring 460 is disposed over the shaft of each so inserted bolt 430. Each bolt is then inserted into a hole 442 at associated sites 434 and 438 and tightened therein to compressively capture spring 460 between upper slip plate 450 and associated lower support plate 464. As seen in FIG. 6, upper slip plate 450 comprises an camrol bias extender 482, the function and purpose of which is described in detail hereafter.

Thus assembled, each left and right hand portion of intermediate suspension assembly 404 is hingeably attached to upper housing assembly 402 and lower housing assembly 406. Upper slip plate 452 comprises a blind hole 474 disposed longitudinally at proximal side site 486. A similar hole 474 is comparably disposed on distal side 490, but not shown. Upper housing assembly 402 comprises a proximal bracket 456 which comprises a force fit mounting hole 476 at site 480, for a short pin 462. The diameter of blind hold 474 is greater than the diameter of short pin 462, and short pin 462 is shorter than the depth of blind hole 474. To hingeably affix upper slip plate 452 to proximal bracket 456, hole 474 at site 486 is juxtaposed hole 476 at site 480 and short pin 462 is forcibly inserted through hole 476 at site 480 and into hole 474 at site 486 until the proximal end of short pin 462 is flush with the proximal surface of bracket 456.

Upper slip plate 452 comprises a similar blind hole 474 on distal side 490. Also, distal upper bracket 458 comprises a hole 476 which is juxtaposed blind hole 474 when a pin is inserted at site 486. A short pin 462 is similarly inserted into hole 476 at site 480' and into blind hole 474 on distal side 490 to complete hingeable attachment of upper slip plate 452 to upper housing assembly 402.

Proximal upper bracket 456 is similarly hingeably attached to upper slip plate 450 at juxtaposed sites 478 and 488, respectively. Distal sites 478 and 488 are separated by a distance greater than the lateral width of upper slip plate 452. Distal upper bracket 458 is also similarly hingeably affixed to upper slip plate 450 at juxtaposed holes comprising hole 476 at site 478' of the distal upper bracket 458 and at a hole 474 (not shown) on the distal side of upper slip plate 450. Thus upper slip plate 450 is rigidly affixed relative to upper slip plate 452.

Once each long bolt is tightened and thereby tightly affixed to an associated lower plate 464, a hole 440 is medially and longitudinally drilled therethrough at site 446' in the leftmost lower plate 464 and at site 446 in the rightmost lower plate 464. Each hole 440 comprises a larger diameter than pin 444. Each pin 444 is essentially the same diameter as each pin 462.

Lower housing assembly 406 comprises a proximal bracket 436 and a distal bracket 466. Proximal bracket 436 comprises a pair of holes 468 at sites 470 and 472. Sites 470 and 472 are separated by the same distance separating site 478 from site 480. Similarly, distal bracket 466 comprises a pair of adjacent holes 468 at sites 470' and 472' which are disposed in juxtaposed relation to sites 470 and 472, respectively.

To attach intermediate suspension assembly 404 to lower housing assembly 406, a pin 444 is inserted until disposed in flush mounted relation through hole 468 at site 472', hole 440 at site 446' and hole 468 at site 472. To complete the attachment, another pin 444 is inserted until disposed in flush mounted relation through hole 468 at site 470', hole 440 at site 446 and hole 468 at site 470.

Thus affixed to upper housing assembly 402 and lower housing assembly 406, the hingeable parts of intermediate suspension assembly comprise a rhomboid which maintains a plane defined by sites 480, 480', and 478 and another plane defined by sites 472, 472', 470 in substantially parallel and unchanging angular relationship independent of lateral misalignment of the upper housing assembly to the lower housing assembly. Such misalignment can occur as the carriage 50 to which the brake 300 is affixed travels vertically along the length of guide rail 400' which is not true along the entire length of mast 410'. Further, as each long bolt 430 is disposed through a hole 484 of larger diameter than inserted long bolt 430, compression of intermediate housing assembly 404 during the decelerating of upper housing assembly 402 toward lower housing assembly 406 is relieved by downward slippage of slip plates 450 and 452 along long bolts 430, thereby preventing damage to non-structurally supporting parts of intermediate housing assembly 404.

Referring to FIGS. 2, 5, and 7, lower housing assembly 406 comprises a braking cam 490, a camrol guidance bearing 492, a solenoid assembly 528, and two carriage decelerating shock absorbers 494. Of course, the number of shock absorbers can be varied to match the effective decelerating load requirements of carriage 50. Solenoid assembly 528 comprises a solenoid 580, a solenoid housing 498, a solenoid plunger 502, a solenoid plunger bracket 504, and a solenoid housing rod 506. Solenoid plunger bracket 504 comprises and L-shape, the upper, vertical portion of which is firmly and permanently affixed to a panel 496 of lower housing assembly 406 by screws, welding or the like. The lower horizontal portion of the solenoid plunger bracket 504 turns at a right angle from the vertical portion to form a horizontal plane where solenoid plunger 502 is firmly anchored. Thus, the position of solenoid plunger 502 is fixed relative to lower housing assembly 406 while the solenoid coil containing portion 518 is free to vertically reciprocate over solenoid plunger 502 as indicated by arrow 520, seen in FIG. 7.

The solenoid coil 396 of solenoid 580 is activated by overspeed detection circuit 100. As seen in FIG. 2, electrical cable 394 from the overspeed detection circuit 100 provides activating current directly to solenoid coil 396. Solenoid 580 may comprise a Solenoid 290005-023, available from LEDEX, Inc., Vandahlia, Ohio 45377.

As best seen in FIG. 5, braking cam 490 is hingeably affixed to a substantial support member of lower housing assembly 406 by a shoulder screw 522 which passes through the braking cam 490. As seen in FIGS. 5 and 7, solenoid housing 498 is firmly affixed first to solenoid 580 and second to solenoid housing rod 506 which extends vertically to a hinged connection to braking cam 490. Solenoid housing rod 506 is hingeably connected to braking cam 490 by a pin 508 such that reciprocal movement of solenoid housing 498 due to action between solenoid coil 396 (or solenoid coil 398 in the case of a second brake) causes braking cam 490 to rotate in the directions of arrow 530.

Braking cam 490 comprises teeth on end 532 such that, when braking cam 490 rotates into contact with guide rail 400' by the action of solenoid 580 on solenoid plunger 502 and concurrent falling of carriage 50, teeth on end 532 engage and are thereby forced into guide rail 400' braking lower housing assembly 406. Solenoid plunger 502 is spring loaded to prevent damage to the solenoid components when the braking cam 490 is fully rotationally driven to stop carriage 50. The position of solenoid housing 498 and braking cam 490 when rotated to a braking position is seen as dashed lines in FIG. 7.

To prevent brake parts 406 from contacting varing portions of guide rail 410', camrol guidance bearing 492 is rigidly attached to lower housing assembly 406 which contacts and thereat rides upon guide rail 400' as seen in FIG. 2. Camrol guidance bearing 492 is influenced to remain constantly in contact with guide rail 400' by a bias provided by spring bias lever assembly 534. As best seen in FIGS. 6 and 9, spring bias lever assembly 534 comprises a lever member 540, an shoulder screw 542, and a compression spring 544. Spring bias lever 534 comprises a lever bar 546 which is permanently affixed to upper slip plate 450 and extends laterally therefrom to enlargedly become a spring containment ring 548 disposed directly below braking plate 420. Spring containment ring 548 comprises a vertically disposed orifice 550 through which the shaft of shoulder screw 542 insertably passes. Compression spring 544 is disposed about the shaft of shoulder screw 542 after adjustment screw 542 is inserted through orifice 550. Further braking plate 420 comprises a threaded hole 552 into which shoulder screw 542 threadably attaches. In assembly, after intermediate suspension assembly 404 is attached to upper housing assembly 402 and lower housing assembly 406, and affixed to carriage 50 on guide rail 400', shoulder screw 542 is turned in hole 552. Thereat, the compression spring 544 reacts against the spring containment ring. Thus installed, compression spring 544 provides a constant bias to control guidance bearing 492 through intermediate suspension assembly 404.

Referring again to FIG. 2, two shock absorbers 494, one each side of guide rail 400', are seen mounted atop lower housing assembly 406. So mounted, each shaft and shock absorber pad 556 of each shock absorber 558 and 560 is disposed directly below braking plates 420 and 422, respectively. Each shock absorber 494 may be a hydraulic shock absorber having a one and one-eighth inch bore and a four inch stroke with a potential and kinetic energy capacity of 30,000 inch-pounds.

Thus, when a overspeed condition occurs and the electrical energy of motor 260 is applied to solenoid coil 396, the solenoid assembly 528 retracts about solenoid plunger 502 which is stationary relative to lower assembly housing 406. Through solenoid housing rod 506 braking cam 490 is rotated such that the end 532 of braking cam 490 engages the cam teeth with guide rail 400'. Upon contact with guide rail 400', the force of the falling carriage 50 continues to force the braking cam 490 teeth into guide rail 400' pivoting the braking cam 490 its full travel within the lower braking assembly 406. The solenoid plunger 502 is spring loaded to prevent damage to solenoid assembly 528 when braking cam 490 is disposed at its full travel limit. As the teeth at end 532 of braking cam 490 are driven into guide rail 400', lower housing assembly is pivoted in the direction of braking cam 490, which unloads camrol guidance bearing 492. In this position, the teeth in the end 532 of braking cam 490 exert a shear stress on the guide rail 400' and the braking cam 490 serves to lockably brake the lower housing assembly 406 to guide rail 400'. The carriage 50 attached upper housing assembly 402 comprising bracket plates 420 and 422 continue to drive downward to contact with each shock absorber 558 and 560, respectively. The action of shock absorbers a 558 and 560 decelerate carriage 50.

Actuator 200 can be interconnected with one or more brakes 300 as seen in the schematic of FIG. 10. The schematic of FIG. 10 provides a dual mast storage and retrieval vehicle carriage 50' suspended to travel vertically between two masts 410 and 410' and two associated guide rails 400 and 400'. Actuator 200 is seen therein to be affixed to carriage 50' at one position 590 and electrically interconnected to two brakes 300 disposed at positions 592 and 594 near guide rails 400 and 400', respectively.

On a dual mast storage and retrieval vehicle, carriage 50 is disposed between two masts 410 and 410' to ride vertically along two rails 400 and 400', respectively. Actuator 200 is firmly attached to carriage 50 and is disposed to acquire rate of carriage travel relative to guide rail 400, although actuator 200 may be disposed to acquire rate of travel from any guide rail along which carriage 50 travels. One brake 300 is also seen disposed guide rail 400. Another like brake, designated brake 300' is disposed along guide rail 400' although other guide rails and guide rail positions can be used within the scope of the invention. Electrical cable 394 comprises a parallel "T" connection 593 which electrically connects the coils of each solenoid 580 in series with the output of electrical circuit 100 in actuator 200. In this fashion, a plurality of brakes which are actuated at substantially the same time are connected directly to the electrical output of actuator 200.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for braking a vertically travelling storage and retrieval carriage which travels along at least one guide rail or mast, said apparatus comprising:
   means for sensing rate of travel of the carriage, generating an electrical voltage which is a function of the rate of carriage travel, and providing a brake actuating electrical signal when the rate of carriage descent is over a predetermined velocity;
   at least one means for braking the carriage electrically connected to said sensing, generating and providing means, said braking means comprising:
   braking cam means and means about which said braking cam means rotate into braking engagement against a guide rail or mast;
   means for independently activating the at least one braking means by rotating said braking cam means into braking engagement against the guide rail or mast upon receipt of said electrical signal.

2. The apparatus according to claim 1 wherein the braking cam means comprise means for maintaining said braking cam means at a predetermined operational distance away from the guide rail or mast.

3. The apparatus according to claim 1 wherein the sensing, electrical generating, and voltage providing means comprise means juxtaposed a guide rail or mast for translating a linear carriage rate of travel relative to the guide rail or mast to a rotational rate.

4. The apparatus according to claim 3 wherein the sensing, electrical generating, and voltage providing means comprise tach/generator means directly coupled to the translating means, the tach/generator means generating an electrical voltage which is a function of the rotational rate.

5. The apparatus according to claim 1 wherein the sensing, electrical generating, and voltage providing means comprise an electrical circuit for determining if the electrical voltage is above a predetermined threshold indicating overspeed descent of the carriage and only supplying electrical current to the at least one braking means when the carriage overspeed condition exists.

6. The apparatus according to claim 1 wherein the sensing, electrical generating, and voltage providing means comprise the only sources of electricity for the sensing, electrical generating, and voltage providing means and the only source of energy for the at least one braking means.

7. The apparatus according to claim 1 wherein the at least one braking means comprise at least two mechanically independent braking means.

8. The apparatus according to claim 1 wherein the storage and retrieval vehicle comprises a single mast whereupon the carriage vertically travels.

9. The apparatus according to claim 1 wherein the storage and retrieval vehicle comprises a dual mast wherebetween the carriage vertically travels.

10. The apparatus according to claim 1 wherein the braking cam means comprise a mechanically activated brake cam.

11. The apparatus according to claim 10 wherein the brake cam comprises teeth formed on a mast engaging end which, when engaged against the rail, brakes the carriage.

12. The apparatus according to claim 10 wherein the activating means comprise solenoid means which are only actuated by current received from the sensing, electrical generating, and voltage providing means.

13. The apparatus according to claim 12 wherein the solenoid means comprise means for mechanically linking the solenoid means and brake cam such that actuation of the solenoid means rotates the brake cam thereby engaging the brake cam against the guide rail or mast and braking the carriage.

14. The apparatus according to claim 13 wherein the solenoid means comprises solenoid housing means and solenoid plunger means.

15. The apparatus according to claim 14 wherein the means for mechanically linking comprises a hingeable linkage between the solenoid housing means and brake cam such that the weight of the housing is a counter balance against the guide rail or mast contacting portion of the brake cam and the solenoid plunger means is rigidly affixed to a non-moving part of the braking means, thus providing a mechanical link which requires only said sensing, generating, and providing means produced energy to activate the brake cam.

16. Actuator apparatus for sensing overspeed descent, along a guide rail or mast, of a vertically travelling carriage of a storage and retrieval vehicle and for activating at least one braking means, said actuator comprising:
   at least one friction wheel means whereby linear travel of the carriage along the guide rail or mast is translated to a rotational rate;
   A tach/generator means directly coupled to the at least one friction wheel means whereby the rotational rate of the friction wheel means drives the tach/generator means;
   electrical circuit means receiving output from the tach/generator means for detecting overspeed descent of the carriage and for providing an electrical current output only when an overspeed descent is detected; and
   at least one electrical solenoid means, each solenoid means comprising means for contiguously interconnecting to a braking cam of the at least one braking means and for receiving and being actuated by the electrical current output to directly reposition the braking cam to activate the at least one braking means.

17. Actuator apparatus according to claim 16 wherein the at least one friction wheel means comprise at least two friction wheels.

18. Actuator apparatus according to claim 17 wherein the at least two friction wheels are mechanically linked such that the rotational rate of each friction wheel is the rate of travel of the wheel having the greatest traction along the guide rail or mast.

19. The actuator according to claim 16 further comprising means for operatively affixing said actuator between the carriage and the guide rail.

20. The actuator according to claim 16 wherein the electrical circuit means further comprise means for electrically determining a voltage signal level and a predetermined threshold voltage level of the signal indicating overspeed descent of the carriage, said electrically determining means only upon detecting an above threshold voltage signal level providing the electrical current output to the at least one solenoid means.

21. The actuator according to claim 20 wherein the electrical circuit means further comprise electrical conduction means which provide the only means for communicating between said electrical circuit means and the at least one solenoid means.

22. Actuator and braking apparatus for sensing overspeed descent, along a guide rail or mast, of a vertically travelling carriage of a storage and retrieval vehicle, and for actuating at least two cam braking devices, said actuator and braking apparatus comprising:
   at least two mechanically independent cam braking devices shaped such that braking forces are increased upon descent and operatively affixed to the carriage;
   wheel means whereby linear travel of the carriage along the guide rail or mast is translated to a rotational rate;
   a tach/generator means directly coupled to the wheel means whereby the rotational rate of the wheel means drives the tach/generator means;
   electrical circuit means receiving a voltage signal output from the tach/generator means for detection of overspeed descent of the carriage and for providing an electrical current signal output to the at least two mechanically independent cam braking devices;
   electrical cable means which delivers the electrical signal output from the electrical circuit means to the at least two electrically activated cam braking devices.

23. Actuator and braking apparatus apparatus according to claim 22 wherein the wheel means comprises at least two friction wheels.

24. Actuator and braking apparatus apparatus according to claim 22 wherein the at least two friction wheels are mechanically linked such that the rotational rate of each friction wheel is the rate of travel of the wheel having the greatest traction along the guide rail or mast.

25. The actuator and braking apparatus according to claim 22 further comprising means for operatively affixing said actuator apparatus between the carriage and the guide rail or mast.

26. The actuator and braking apparatus according to claim 22 wherein the electrical circuit means comprise means for electrically determining occurrence of a predetermined threshold level of the voltage signal indicating overspeed of the carriage, said electrically determining means only then providing electrical current drive for the at least two braking means.

27. The actuator according to claim 22 wherein the tach/generator means comprise the only source of electrical power for the braking devices.

28. Actuator apparatus according to claim 21 wherein the tach/generator means generate and provide the only source of energy for actuating the braking devices.

29. Actuator and braking apparatus for sensing overspeed rate of descent of a dual most storage and retrieval vehicle carriage when traveling along at least two guide rails or masts and for actuating at least one braking device when overspeed rate of descent occurs, said apparatus comprising:

at least one braking device attached to the carriage and disposed at one of the at least two guide rails or masts;

electrical actuator apparatus disposed at one of the at least two guide rails or masts, said electrical actuator apparatus comprising:

at least one wheel means biased to rotatably measure relative rate of travel of at least one wheel against the relatively static guide rail;

tach/generator means directly coupled to at least one wheel and which generate an electrical signal which is a function of the rate of travel of the carriage and rotation of the at least one wheel;

electrical circuit and communication means whereby, when an overspeed condition is interpreted, an actuating signal is sent to the at least one braking device;

said at least one braking device comprising braking cam means which comprise a guide rail engaging braking cam and pivotally attached braking cam rotating solenoid means which are activated by a current only received from the electrical circuit and communication means when an overspeed condition is interpreted and to directly rotate said braking cam into braking engagement with the guide rail or mast.

30. Actuator and braking apparatus according to claim 29 wherein the at least one braking device comprises at least two braking devices.

31. Actuator and braking apparatus according to claim 30 wherein the at least two braking devices are disposed such that at least one braking device is disposed on one guide rail or mast and another braking device on another guide rail or mast.

32. Actuator and braking apparatus according to claim 30 wherein at least one braking device is disposed on each side of the carriage and operates mechanically independently from the other braking device.

33. Actuator and braking apparatus according to claim 30 wherein the actuator apparatus is disposed on one guide rail or mast and one of the at least two braking devices is disposed on another guide rail or mast and another of the at least two braking devices is disposed on still another guide rail or mast.

34. Actuator and braking apparatus according to claim 29 wherein the actuator apparatus is disposed on one guide rail or mast and the at least one braking device is disposed on another guide rail or mast.

35. Electricity generating actuator apparatus and braking system for sensing overspeed rate of descent of a dual mast storage and retrieval vehicle carriage when traveling along at least two guide rails or masts and for actuating at least two cam braking devices when the carriage is descending at too rapid a rate, said apparatus and braking system comprising:

at least two mechanically operatively independent cam braking devices;

at least two solenoids, each solenoid comprising means for contiguously affixing each solenoid to one of said at least two mechanically operatively independent cam braking devices;

means for detecting an electrical equivalent of the rate of descent of the carriage and for generating an electrical current signal to activate each said solenoid and consequently actuate each contiguously associated cam braking device only when an overspeed condition occurs.

36. A method for activating a brake on a carriage of a storage and retrieval vehicle comprising the steps of:

providing a solenoid directly and contiguously interconnected to a braking cam;

electrically sensing a rate of travel of said carriage and generating an electrical current thereby;

transmitting at least a portion of the current to the solenoid only when said rate of travel exceeds a predetermined speed and direction, said current portion being adequate to activate the solenoid;

activating the solenoid and thereby directly rotating the contiguously interconnected braking cam into braking orientation; and engaging said cam against a relatively static vertical mast member such that braking forces are increased due to a camming action of said cam upon descent to thereby brake the carriage.

37. A method for activating a brake on a carriage of a storage and retrieval vehicle comprising the steps of:

electrically sensing a rate of travel of said carriage and generating an electrical current thereby;

transmitting at least a portion of the current to a solenoid only when said rate of travel exceeds a predetermined speed and direction, said current portion being adequate to activate the solenoid;

activating the solenoid and thereby directly rotating a braking cam into braking orientation;

engaging said cam against a relatively static vertical mast member such that braking forces are increased due to a camming action of said cam upon descent to thereby brake the carriage; and while in a non-braking condition, maintaining said braking cam within a predetermined critical distance of said mast by spring forced camrol guidance bearing means.

38. The method according to claim 37 wherein said engaging step further comprises moving said camrol guidance bearing means away from said mast such that the camrol guidance bearing means are not damaged during braking.

39. Apparatus for sensing and braking an overspeed descent of a carriage of a storage and retrieval vehicle which travels along a guide rail, said apparatus comprising:

means for deriving electrical energy from movement of the storage and retrieval carriage;

means for emitting a brake initiating electrical signal solely produced from electrical energy received from said electrical energy deriving means only when the energy from the deriving means exceeds a predetermined threshold indicating an overspeed descent of said carriage;

means for braking said carriage which receive the braking signal from said emitting means and use only the energy of the braking signal to brake the carriage without benefit of mechanical gain from potential energy stored in a spring.

40. Apparatus according to claim 39 wherein said braking means comprise a brake housing rigidly affixed to said carriage, a rotatable braking cam comprising a rail engaging first side, a center of rotation, and a cam actuating second side opposite the center of rotation from the first side.

41. Apparatus according to claim 40 wherein said braking means further comprise a cam actuator solenoid comprising a solenoid housing, a solenoid plunger affixed to said brake housing and electrical connection from said emitting means to the coil of the cam actuator solenoid.

42. Apparatus according to claim 41 wherein said braking means further comprise pivotal linkage means connecting said braking cam to said solenoid housing such that said solenoid housing is connected to the second side of the cam through said pivotal linkage means and counterbalances said cam in an inoperative position when no signal is received by the coil and moves upon said plunger to thereby actuate the brake when the brake initiating signal is received by the coil.

43. Apparatus according to claim 40 wherein said braking means further comprise spring forced camrol guidance bearing means whereby said cam is maintained at an operable distance from said guide rail while the carriage moves relative to said guide rail.

* * * * *